March 31, 1942.  A. F. WILLAT  2,277,895
TEMPERATURE CONTROL DEVICE
Filed April 22, 1940
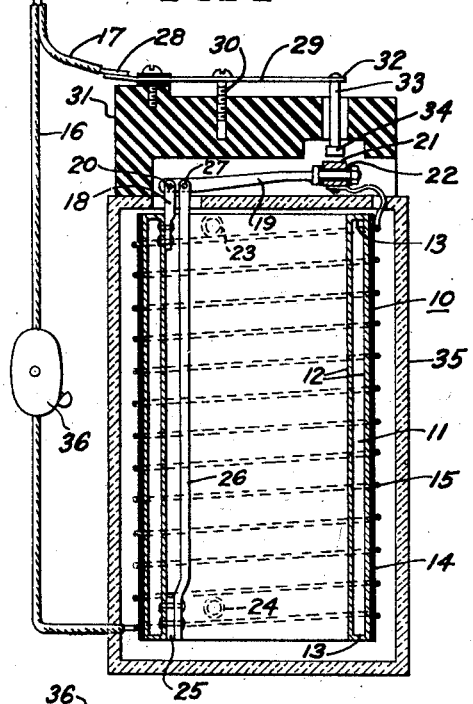
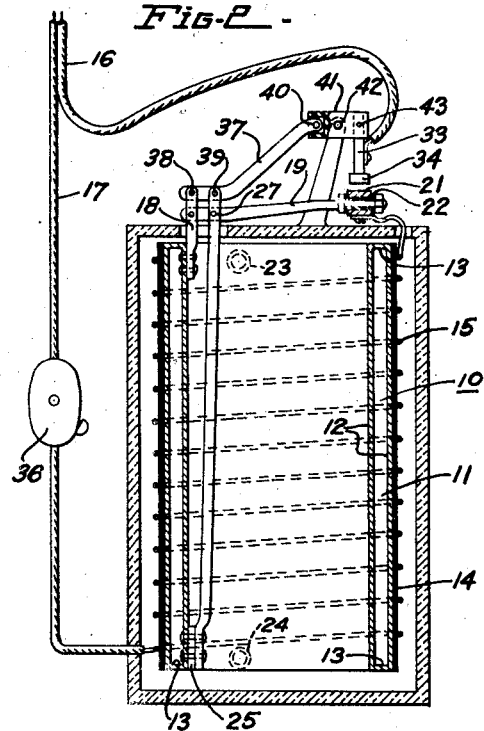
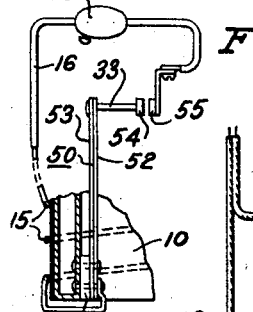
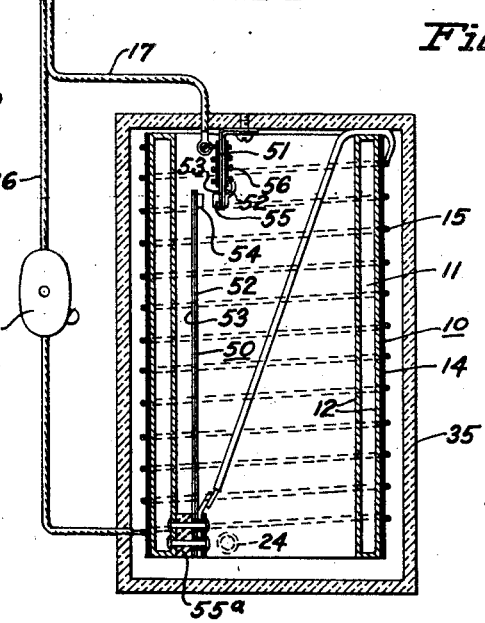
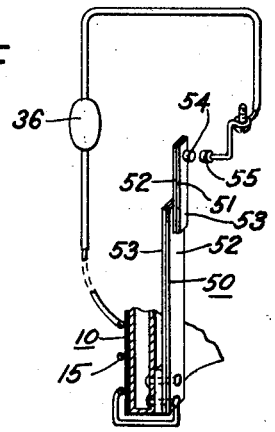
INVENTOR.
ARNOLD F. WILLAT
BY
ATTORNEY.

Patented Mar. 31, 1942

2,277,895

UNITED STATES PATENT OFFICE 2,277,895

TEMPERATURE CONTROL DEVICE

Arnold F. Willat, San Rafael, Calif.

Application April 22, 1940, Serial No. 330,894

7 Claims. (Cl. 219—38)

This invention relates to a thermostat temperature control device and more particularly to such a device in which there are two members, one of which members is affected in its thermostatic action by heat generated by electric current.

Thermostats of many types and forms are well known in the mechanical arts, and may be adjusted to operate at a low temperature or a high temperature. One of the defects, however, has been that when they are adjusted to operate at low heat, they frequently operate much too sensitively, and when they are adjusted to operate at high temperature they do not operate rapidly enough. Difficulty has also been experienced with the rapidity of action and the tightness of the contact made by the thermostats both in making and breaking an electric circuit, since the make and the break, if slow, causes a sputtering spark. Also, thermostats have heretofore been dependent solely on their own reactions to temperature, without dependence on the thermal expansion of the body of the device in which the temperature is to be controlled by the thermostat.

For the purpose of overcoming these and other known defects, it is an object of this invention to provide a thermostatic control device in which one member of a thermostat is affected by the heat or temperature produced therein by an electric circuit passing therethrough. A further object of the invention is to provide a thermostat control for a device in which temperature is to be controlled, and in which the thermal expansion and contraction of the controlled device is a factor in the operation of the thermostat.

With the foregoing and other objects in view, all of which will be more apparent as this description proceeds, the invention is exemplified in one form in the novel construction and combination of parts hereinafter described, illustrated in the accompanying drawing, and pointed out in the claims hereto appended, it being understood that various changes in the form, proportion, size and details of construction of the apparatus may be resorted to within the scope of the appended claims without departing from the spirit or sacrificing any of the advantages of the invention.

To more clearly comprehend the invention, reference is directed to the accompanying drawing wherein:

Fig. 1 is a vertical cross-section of a device in which temperature is to be controlled, showing structure of thermostat in connection therewith.

Fig. 2 is a vertical sectional view of a modified form of adaptation of the invention.

Fig. 3 is a vertical sectional view, partly broken away of another modified form which the invention may take.

Figs. 4 and 5 are each another modified form of thermostat assembly.

Referring to the drawing, in which like characters of reference indicate corresponding parts in the several views, and more specifically referring to Fig. 1, 10 is a flash boiler comprising a cylindrically formed body provided with a steam chamber 11 formed by closely spaced walls 12 which are closed at the opposite ends 13, thus providing a chamber of small volume and large surface area. As an example, this boiler chamber may be made of copper which readily expands under the influence of increased temperature and thus increases the length of the body of the steam chamber 11. The outer wall of the steam chamber is immediately surrounded by an insulation member 14, such as a coating sheet of mica. Circumferentially of the mica coating is a helical electrical resistance coil 15 which is in an electric circuit when the thermostatic contacts are closed. Lines 16, 17 indicate generally the lead wiring for such a circuit. Automatic temperature control is provided for the flash boiler by controlling the coil 15.

At one end of the steam boiler body 10 is a fixedly mounted bracket 18 which mounts a lever 19 pivoted thereto at 20. The lever 19 mounts at its opposite end an electrical contact point 21 which is insulated from lever 19 by suitable insulation material 22. The contact 21 is connected in the electric circuit through the coil 15. It is understood that the coil 15 has suitable electrical resistance characteristics so that it will have a quick high temperature, usually glowing, when an electrical circuit is passed therethrough and so that it will thus produce a high temperature in the steam chamber 11 to accomplish the purposes for which a flash boiler may be employed; that is, effecting steam pressure in a steam chamber in which the temperature is relatively high, so that when a jet or slug of vaporizable liquid, such as water, is injected thereinto, the water will be almost instantaneously converted to steam, whereby the expansion of the steam may be employed in any suitable manner, such as for its pressure in spraying insecticides or in paint-spray operations.

In exemplifying this one form of adaptation of the invention, the flash boiler may be provided with an inlet 23 through which a jet of water may be introduced and an outlet 24 through which steam may be discharged through a conduit to any suitable environment for use of the steam.

To utilize the expansion of the flash boiler as a cooperative element in the temperature control, a rod 26 is fixedly mounted as at 25 at the opposite or bottom end of the flash boiler body. The rod 26 is spaced from the inner wall of the flash boiler and has its opposite end pivotally connected to lever 19 by pivot pin 27. The rod 26, being spaced from the flash boiler, will not be effected by the temperature of the flash boiler to the same extent that the walls 12 of the flash boiler are effected by that temperature, and therefore, even if the rod 26 were made of the same material as the flash boiler it would not have the same longitudinal expansion and contraction as the flash boiler. However, it is preferable that the rod 26 be made of a material which has a lesser co-efficient of thermal expansion and contraction than the material of the flash boiler. For example, if the shell of the flash boiler is made of copper, the rod 26 could be made of iron, iron having a lesser thermal expansion and contraction than copper. The other end of the electric circuit 17 may be connected as at 28 to a slightly resilient circuit conduit link 29, the resiliency of which may be adjusted by a machine screw 30 set in insulation block 31. At a free end 32 of the conduit link 29, and also being in the electric circuit, there is a depending element 33, the free end of which is provided with an electrical contact point 34. While it is not an essential part of the invention, it is preferred that the contact points 21 and 34 should be of high electrical conductivity and also resistant to flux, silver being a suitable and very efficient conductor for this purpose. The depending circuit member 33 is of a material which is highly resistant to electrical current and expands with great rapidity responsive to an electrical current being passed therethrough, and likewise contracts with great rapidity when the electric circuit is broken and the temperature of the member 33 is thereby reduced. A suitable material for the purpose of member 33 is a narrow strip or wire of nichrome which has the characteristic of heating and expanding rapidly in an electric circuit, and cooling and contracting rapidly when the circuit is broken therethrough. For most efficient results, it is preferred that the contact point 34 of member 33 should not move as great a total distance as the contact member 21 of lever 19, but it is likewise preferred that its movement should be relatively faster than the movement of contact 21.

When the thermostat assembly is employed with a flash boiler as is illustrated in Fig. 1, the exterior of the heating coil 15 may have an enclosing insulation body or casing 35.

The structure of Fig 1, in operation, may be described as follows:

When the flash boiler is cool, before starting any operations, the body is contracted and the rod 26 has pushed lever 19 upwardly so that the thermostat contacts 21, 34 are in make relationship. Upon operation of switch 36, an electric circuit is closed through coil 15 and members 21, 34, 33 and 29. This circuit heats the steam chamber 11 to a temperature at which it will flash steam. The temperature within the flash boiler being raised, the flash boiler expands or increases its length longitudinally, thus increasing the distance between the top bracket 18 and the lower mounting 25 which in turn causes the rod 26, when a steam-flash temperature has been reached in the steam chamber, to pull lever 19 downwardly and thus break the contact at the contact points 21, 34. The break of the circuit instantly lowers the temperature in the expandible nichrome member 33 so that, while the movement of the lever 19 may be relatively slow, the contact point 31 draws the contact point 34 away from the contact 21, due to the instantaneous contraction of wire 33, thus insuring a sharply delineated break in the circuit with a single spark and no sputter. When the temperature of the flash boiler is decreased from breaking the circuit, the shell of the steam chamber 11 contracts and thus the rod 26 again raises the contact point 21 to make the circuit with contact 34. Instantly, upon completion of the circuit, the member 33 begins to heat and thereby expand in length, making a sharp, decisive, one-spark contact, and increasing the tightness of that contact as the member 33 increases in temperature. By arranging the member 33 so that the contact 34 moves a very short distance, but moves that distance almost instantly, whereas the contact 21 moves a greater distance, but moves more slowly, a thermostat assembly is provided which is extremely sensitive to changes of temperature of the flash boiler and quick-acting, sputtering of make and break sparks and fluxing of the contact points are eliminated, and the contact is a tight fitting, serviceable, and efficient connection. Since one end of the thermostat moves directly responsive to the temperature of the flash boiler, rather than to the temperature of the coil, the heat of which is latently retained by the surrounding insulation, the thermostat is more responsive to the temperature of the boiler than to the temperature of the coil, and is therefore very sensitive to the effect of change of temperature in the flash boiler.

In the modification of Fig. 2, the bracket 18 is extended upwardly and pivotally mounts a second lever 37 as at 38. The rod 26 likewise extends upwardly and pivotally connects with lever 37 as at 39. The lever 37 connects as at 40 with an insulation block 41, the latter having a pivotal mounting 42 on any suitable frame or casing. The other end of the insulation block has mounted thereto as at 43 a member 33 having similar characteristics to the relative member 33 of Fig. 1. An electric conduit 17 is connected to the member 33 and the electric circuit is completed by switch 36 when the contacts 31 and 34 are in make relation. The operation of the apparatus in Fig. 2 is substantially similar to that in Fig. 1, except that upon the longitudinal expansion of the body of the steam chamber 11 the rod 26 pulls the levers 19 and 37 downwardly and thus pulls the contact 21 downwardly; but by reason of the pivotal mounting 42, the lever 37 pulls the contact point 34 upwardly. Upon reduction of temperature in steam chamber 11, the reverse action of the levers 19 and 37 takes place and again brings the contact points into make relation. The expansion of member 33 operates in the same manner in both Figs. 1 and 2.

In Fig. 3 the thermostat comprises two sections of a bar 50 and 51. Each section comprises overlying strips 52, 53 having relatively different co-efficients of thermal expansion, similar strips being oppositely disposed. Each of the bars 50, 51 has a contact point 54, 55. One bar 50 is connected as at 55ᵃ to the inner wall of the flash boiler 10 and extends longitudinally centrally within the hollow of the cylinder so that it is affected by the temperature of the steam chamber rather than the coil 15. The bar member 51 is preferably shorter than the bar 50 but it has heat directly applied thereto so that its thermostatic action is greatly facilitated. The second thermostatic bar 51 may be heated by making it so relatively thin that upon passing an electrical current therethrough its temperature will be increased, or it may be heated in the manner illustrated in Fig. 3 by connecting it in the circuit or conduit 17 formed of a conducting material of high resistance so that it immediately heats on passing current therethrough and cools very quickly when the circuit is broken. This terminal portion 56 of conduit 17 may be of nichrome wire and wound helically around the bimetal bar 51 and be connected to the terminal contact 55. Thus when the boiler is cool, the contacts 54 and 55 are in make relation and when the boiler is heated to a predetermined temperature the bar 51, being operated by the temperature of the boiler, breaks the contact. Since the bimetal bar 51 is superheated by the coil 56, it operates to flex much more quickly than the bar 50, but being of relatively shorter length, the amplitude or flexure of its contact point is not as great as bar 50.

In referring to the members 33, and 51 as being in the electric circuit and expandible by heat from such circuit, it is realized that practically all metals expand by heat and that substantially any metal in an electric circuit is theoretically heated to a degree by the current therethrough, but what is intended in this application is the characteristic of an expansion of the member by heat of the current sufficiently to quickly alter its physical dimensions for the purpose recited.

In Fig. 4 the expandible and contractible electrical conduit member 33 of Figs. 1 and 2 is combined with the bi-metal bar 50 of Fig. 3, in which event the bi-metal bar 50 operates as in Fig. 3 and mounts at its free end the expandible and contractible nichrome member 33 with contact 54 thereon, in which event it is not essential that the other contact point 55 be other than an ordinary conduit through which an electric current may pass.

In Fig. 5 the thermostat elements of Fig. 3 are employed with a variation of arrangement, the bi-metal bar 50 and the bi-metal bar 51 forming a continuous bar, with the bar 50 operating to flex responsive to the temperature of the device in which temperature is controlled; in this instance, the flash boiler 10. The bar portion 51 is of such relatively reduced cross-sectional area that its flexure is superinduced by heat of the electric energy passing through its body, and the contact 55 may be merely a contact without other functional characteristics. In such modification similar strips 52, 53 of bi-metal bars 50, 51 are abutting.

Having thus described my invention, I claim:

1. In combination with a device having a steam chamber in which temperature is to be controlled and having an electrical means for heating said steam chamber, a thermostat apparatus for controlling the heating means, said thermostatic control apparatus comprising a first member having a contact point in the electric circuit of the heating means, a second member movable to make and break an electrical contact with said first member responsive to changes of temperature of the controlled device, one of said thermostat members including in said thermostat circuit a longitudinally expandible portion which is subject to expansion by heat induced therein by the electric energy of the circuit independently of the temperature of the controlled device, said expansible portion in the thermostat circuit having substantially uniform electrical high resistance throughout its body and being expansible responsive to the electrical current passing therethrough.

2. In combination with a device having a steam chamber in which temperature is to be controlled and having an electrical means for heating said steam chamber, a thermostat control for said heating means, said thermostat control apparatus comprising a first member having an assembly of parts of relatively different co-efficients of thermal expansion and including an electrical contact movable by said first member to make and break the electrical circuit of the heating means, and a second member having the characteristic of longitudinal expansion by heat, said second member being of substantially uniform electrical high resistance throughout its body adapted to be heated by current in the circuit, said second member having an associated electrical contact movable to make and break the circuit.

3. In combination with a device having a steam chamber in which temperature is to be controlled and having an electric heating means adapted for heating said steam chamber, a thermostat control apparatus for making and breaking an electric circuit through the heating means, said thermostat control apparatus comprising a first member having an assembly of parts of relatively different co-efficients of thermal expansion and including an electrical contact movable by said first member to make and break the electrical circuit of the heating means, and a second member including a portion having the characteristic of substantially uniform high electrical resistance and expansion by heat throughout its body, said second member being in the electric circuit as a part thereof and adapted to be heated by current in the circuit, said second member having an associated electrical contact movable to make and break the circuit.

4. In combination with a device having a steam chamber in which temperature is to be controlled and having an electric heating means adapted for heating said steam chamber, a thermostat control apparatus for making and breaking an electric circuit through the heating means, said thermostat control apparatus comprising a first member having an assembly of parts of relatively different co-efficients of thermal expansion and including an electrical contact movable by said first member to make and break the electrical circuit of the heating means, and a second member including a portion having the characteristic of substantially uniform high electrical resistance and expansion by heat throughout its body, said second member being in the electric circuit as a part thereof so as to be a conduit for all the electric current passing through the thermostat and adapted to be heated by current in the circuit, said second member having associated electrical contact movable to make and break the circuit, one of said thermostat members having greater relative movement than the other at the said make and break contact points.

5. In combination with a device having a steam chamber in which temperature is to be controlled and having an electric heating means adapted for heating said steam chamber, a thermostat control apparatus for making and breaking an electric circuit through the heating means, said thermostat control apparatus comprising a first member having an assembly of parts of relatively different co-efficients of thermal expansion and including an electrical contact movable by said first member to make and break the electrical circuit of the heating means, and a second member including a unitary portion having the characteristic of substantially uniform high electrical resistance and expansion by heat throughout its body, said second member being in the electric circuit as a part thereof so as to be a conduit for all of the electric current passing through the thermostat and adapted to be heated by current in the circuit, said second member having an associated electrical contact movable to make and break the circuit.

6. In combination with a flash boiler which includes a steam chamber having internally small volume relative to surface area and an electrical heating means adapted for heating said flash boiler, a thermostat apparatus for controlling the heating means, said thermostat control apparatus comprising a first member having a contact point in the electric circuit of the heating means, and a second member movable to make and break an electrical contact with said first member responsive to changes of temperature of the flash boiler, one of said thermostat members including a unitary portion of high electrical resistance which is a conductor for all of the electrical current passing through the thermostat and which is subject to expansion by heat induced therein by the electric energy of the circuit independently of the temperature of the flash boiler.

7. In combination with a flash boiler which includes a steam chamber having internally small volume relative to surface area and an electrical heating means adapted for heating said flash boiler, a thermostat apparatus for controlling the heating means, said thermostat control apparatus comprising a first member having an assembly of parts of relatively different co-efficients of thermal expansion and including an electrical contact movable by said first member to make and break the electrical circuit of the heating means, and a second member including a portion having substantially uniform high electrical resistance throughout its body and having the characteristic of longitudinal expansion by heat, said second member being in the electric circuit as a part thereof so as to carry all the electric current passing through the thermostat and adapted to be heated and thereby expanded longitudinally by current in the circuit, said second member having an associated electrical contact movable to make and break the circuit, one of said thermostat members being operative more directly responsive to the temperature of the flash boiler than to the temperature of the heating means for the flash boiler.

ARNOLD F. WILLAT.